United States Patent
Day

(10) Patent No.: US 12,401,632 B2
(45) Date of Patent: Aug. 26, 2025

(54) SYSTEM IDENTIFICATION BASED ON DETERMINED CLOCK INFORMATION

(71) Applicant: John W. Day, San Jose, CA (US)

(72) Inventor: John W. Day, San Jose, CA (US)

(*) Notice: Subject to any disclaimer, the term of this patent is extended or adjusted under 35 U.S.C. 154(b) by 307 days.

(21) Appl. No.: 17/964,819

(22) Filed: Oct. 12, 2022

(65) Prior Publication Data

US 2024/0129287 A1    Apr. 18, 2024

(51) Int. Cl.
*H04L 9/40*    (2022.01)
*H04L 7/00*    (2006.01)

(52) U.S. Cl.
CPC ........ *H04L 63/0823* (2013.01); *H04L 7/0012* (2013.01)

(58) Field of Classification Search
CPC .................. H04L 63/0823; H04L 7/0012
See application file for complete search history.

(56) References Cited

U.S. PATENT DOCUMENTS

| | | |
|---|---|---|
| 6,728,880 B1 | 4/2004 | Sites |
| 6,772,361 B1 * | 8/2004 | Walsh ............ G06F 21/57 713/502 |
| 6,993,656 B1 | 1/2006 | Peyravian et al. |
| 8,195,849 B2 | 6/2012 | Williams et al. |
| 8,649,400 B2 | 2/2014 | Darr et al. |
| 9,225,746 B2 | 12/2015 | Osborne et al. |
| 11,671,268 B2 | 6/2023 | Houston |
| 2006/0282668 A1 | 12/2006 | Leitch |
| 2009/0217037 A1 | 8/2009 | Courtay et al. |
| 2010/0009198 A1 | 1/2010 | Kaneda et al. |
| 2013/0212528 A1 | 8/2013 | Lazaridis et al. |
| 2015/0115027 A1 | 4/2015 | Carpenter et al. |
| 2017/0185789 A1 | 6/2017 | Khosravi et al. |
| 2017/0195303 A1 | 7/2017 | Smith et al. |
| 2019/0342101 A1 | 11/2019 | Hayes et al. |
| 2019/0354133 A1 | 11/2019 | Lee et al. |
| 2023/0292265 A1 * | 9/2023 | Aijaz ............ H04W 56/0005 |
| 2024/0089087 A1 | 3/2024 | Ragan |

FOREIGN PATENT DOCUMENTS

JP    2003101528    4/2003

* cited by examiner

*Primary Examiner* — Duc C Ho

(57) ABSTRACT

Embodiments of the present invention provide systems and methods for transmitting messages between multiple devices of a communications network, or multiple nodes of a multiprocessor system, for example. The messages can include instructions related to transactions such as reading and/or writing values to a database, and a clock value and/or clock rate of one or more of the devices can be used to confirm the parties to the transaction before completing or authorizing the transaction and modifying the related database.

25 Claims, 13 Drawing Sheets

| Clock value (current) 205 | Clock value (last message received) 210 | Clock value (initialized) 215 | Payload 220 |

| Time | $s_i$ | $s_j$ |
|---|---|---|
| First Boot | 2000 | 300 |
| $t_1$ | 3000 | 4750 |
| $t_2$ | 55000 | 136750 |
| $t_3$ | 100000 | $s_j.t_3$ |
| $t_n$ | $s_i.t_n$ | $s_i.t_n$ |

SYSTEM IDENTIFICATION BASED ON DETERMINED CLOCK INFORMATION

The present application is related to U.S. patent Ser. No. 17/964,811, filed on Oct. 12, 2022, issued as U.S. Pat. No. 12,198,134, entitled "ENCRYPTION KEY BASED ON SYSTEM CLOCK CHARACTERISTICS," naming John W. Day as inventor, which is incorporated herein by reference in its entirety and for all purposes.

FIELD

Embodiments of the present invention generally relate to the field of computer communication and messaging including electronic transactions and record keeping. More specifically, embodiments of the present invention relate to systems and methods for computer system identification and subsequent secure electronic transactions performed in real-time between multiple systems or nodes.

BACKGROUND

Current approaches to electronic transactions between different devices require complex procedures to identify and authorize parties to the transaction to authenticate a system and ensure the safety and security of the transaction. The added time, resources, and complexity required to identify and authorize parties to the transaction can make these transactions unduly burdensome on systems that process several transactions between different parties at a given time. Many computer communications demand a high degree of certainty and security, e.g., financial transaction-based messages, system identification, and subsequent authorization play a major role in provided the requisite security.

Moreover, existing approaches to electronic transactions may be susceptible to fraud and tampering by parties that are able to obtain a key or identification number used to access accounts that issue the transactions, and for maintaining consistent records of transactions among multiple devices (e.g., computer systems, databases, etc.). A less complicated and more efficient approach to secure communication between devices, including device identification and message encryption, is desired. Moreover, a more efficient and less complex method of system identification is desired as part of the solution for secure communication.

SUMMARY OF THE INVENTION

What is needed is an approach to electronic transactions that can uniquely identify parties to the transaction and encrypt messages based on available information without requiring burdensome encryption or authorization protocols. Accordingly, embodiments of the present invention provide systems and methods for identifying a party to a secure communication and for securely and reliably sending messages between multiple devices of a communications network, or multiple nodes of a multiprocessor system, for example. The messages can include instructions related to transactions such as reading and/or writing data to a database, and a clock value and/or clock rate of one or more of the devices can be used to identify and thereby authorize parties to the transaction, to encrypt and/or decrypt messages, and to guarantee that messages related to the transaction are delivered successfully.

According to one embodiment, a method of automatically identifying a party to an electronic communication in a computer network is disclosed. The method includes a first computer system receiving a first message including a first clock value of a second computer system, storing the first clock value of the second computer system and a first clock value of the first computer system representing an arrival time of the first message at the first computer system in a memory of the first computer system, subsequent to receiving the first message, at the first computer system, receiving a second message including a second clock value of the second computer system, storing the second clock value of the second computer system and a second clock value of the first computer system representing an arrival time of the second message at the first computer system in the memory of the first computer system, determining a function that relates clock rates of the first and second computer systems based on clock values of the memory, and using the function and a time of receipt of a third message from the second computer system and a recorded clock value of the third message to authenticate the second computer system.

According to some embodiments, the method includes, at the first computer system, receiving a third message including a reported third clock value of the second computer system, using the function and a third clock value of the first computer system to estimate an estimated third clock value of the second computer system and a third message to authenticate the second computer system, and verifying an identity of the second computer system when the estimated third clock value of the second computer system is substantially similar to the reported third clock value of the second computer system.

According to some embodiments, the method includes adjusting the estimated third clock value based on an estimated transmission delay of the computer network.

According to some embodiments, the method includes adjusting the estimated third clock value based on a message size of the third message.

According to some embodiments, the method includes adjusting the estimated third clock value based on a distance between the first computer system and the second computer system.

According to some embodiments, the method includes performing a recovery procedure on the second computer system when the second computer system is recovering from a crash.

According to some embodiments, the clock values of the first and second computer systems are stored in a memory-resident table of the first computer system, and the first clock value of the second computer system represents a clock value of the second computer system at the time of transmission of the first message, and further the second clock value of the second computer system represents a clock value of the second computer system at the time of transmission of the second message.

According to a different embodiment, a method of automatically identifying a party to an electronic communication in a computer network is disclosed. The method includes transmitting a first message from a first computer system for receipt by a second computer system over the computer network. The first message includes a first clock value of the first computer system at the time of transmission of the first message, receiving a first reply message from the second computer system at the first computer system over the computer network The first reply message includes a first clock value of the second computer system at the time the first message was received by the second computer system, subsequent to transmitting the first message, transmitting a second message from the first computer system for receipt by the second computer system over the computer network The second message includes a second clock value of the first computer system at a time of transmission of the second message and a third clock value of the first computer system at a time of reception of the first reply message, receiving a second reply message from the second computer system at the first computer system The second reply message includes: a second clock value of the second computer system at a time of transmission of the second reply; and a third clock value of the second computer system at a time of reception of the second message, determining a mathematical relationship between a clock of the first computer system and a clock of the second computer system based on the first message, the second message, the first reply message, and the second reply message, and based on receipt of a new message from the second computer system, the relationship, and an arrival time of the new message at the first computer system, authenticating the second computer system.

According to some embodiments, the authenticating includes transmitting a third message from the second computer system to the first computer system, computing an estimated clock value at an arrival time of the third message based on the mathematical relationship;

accessing a reported clock value of the second computer system at the transmission time of the third message from the second computer system, and verifying an identity of the second computer system when the estimated clock value at the arrival time of the third message is substantially equivalent to the reported clock value at the transmission time of the third message.

According to some embodiments, the method includes adjusting the estimated clock value at the arrival time of the third message based on an estimated transmission delay of the computer network.

According to some embodiments, the method includes adjusting the estimated clock value at the arrival time of the third message based on a message size of the third message.

According to some embodiments, the first computer system and the second computer system include nodes of a loosely coupled multiprocessor system.

According to some embodiments, the method includes performing a recovery procedure on a processor clock of the second computer system when the second computer system is recovering from a crash.

According to some embodiments, the clock values of the first and second computer systems are stored in a memory-resident table of the first computer system.

According to a different embodiment, an apparatus for secure electronic communications, the apparatus is disclosed. The apparatus includes a first node including: a first processor; a first processor clock; and a first memory, the first node in communication with a second node including: a second processor; a second processor clock; and a second memory, and the first processor is operable to receive a first message including a first clock value of a second computer system, store the first clock value of the second processor and a first clock value of the first processor representing an arrival time of the first message at the first processor in a memory of the first processor, subsequent to receiving the first message, receive a second message including a second clock value of the second processor, store the second clock value of the second processor and a second clock value of the first processor representing an arrival time of the second message at the first node in the first memory of the first node, determine a function that relates clock rates of the first and second processors based on clock values of the memory, and using the function and a time of receipt of a third message from the second node and a recorded clock value of the third message to authenticate the second node.

According to some embodiments, the first processor is further operable to receive a third message including a reported third clock value of the second computer system, use the function and a third clock value of the first processor to estimate an estimated third clock value of the second processor and a third message to authenticate the second node, and verify an identity of the second node when the estimated third clock value of the second processor is substantially similar to the reported third clock value of the second processor.

According to some embodiments, the first processor is further operable to adjust the estimated third clock value based on an estimated transmission delay between the first node and the second node.

According to some embodiments, the first node and the second node include nodes of a loosely coupled multiprocessor system.

According to some embodiments, the first processor is further operable to perform a recovery procedure on the second computer system when the second computer system is recovering from a crash.

According to some embodiments, the clock values of the first and second processors are stored in a memory-resident table of the first node. The first clock value of the second processor represents a clock value of the second processor at the time of transmission of the first message, and the second clock value of the second processor represents a clock value of the second processor at the time of transmission of the second message.

According to another embodiment, a method of identifying a second system coupled in communication with a first system is disclosed. The method includes receiving a first message at a first system and from a second system, the first message including a transmission time of the first message as measured by a clock of the second system, storing the transmission time of the first message in a memory of the first system and storing a reception time of the first message as measured by a clock of the first system, receiving a second message at the first system and from the second system, the second message including a transmission time of the second message as measured by the clock of the second system, storing the transmission time of the second message in the memory and storing a reception time of the second message as measured by the clock of the first system, based on the transmission and reception times of the first and second messages, computing a rate relationship between the clocks of the first and second systems, receiving a third message at the first system and from the second system, the third message including a transmission time of the third message as measured by the clock of the second system, computing an estimated transmission time of the third message based on a reception time of the third message as measured by a clock of the first system and further based on the rate relationship, and identifying the second system by determining that the estimated transmission time of the third message matches the transmission time of the third message as included in the third message.

According to some embodiments, the first message further including a start clock value of the clock of the second system and the computing an estimated transmission time of the third message further includes using the start clock value.

According to some embodiments, the storing the transmission time of the first message and the storing the transmission time of the second message both include storing into a data structure of the memory of the first system.

According to some embodiments, the third message is transmitted subsequent to the second message, and the second message is transmitted subsequent to the first message.

According to some embodiments, the determining includes determining that the estimated transmission time of the third message matches within a predetermined threshold to the transmission time of the third message as included in the third message.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Figure 1:
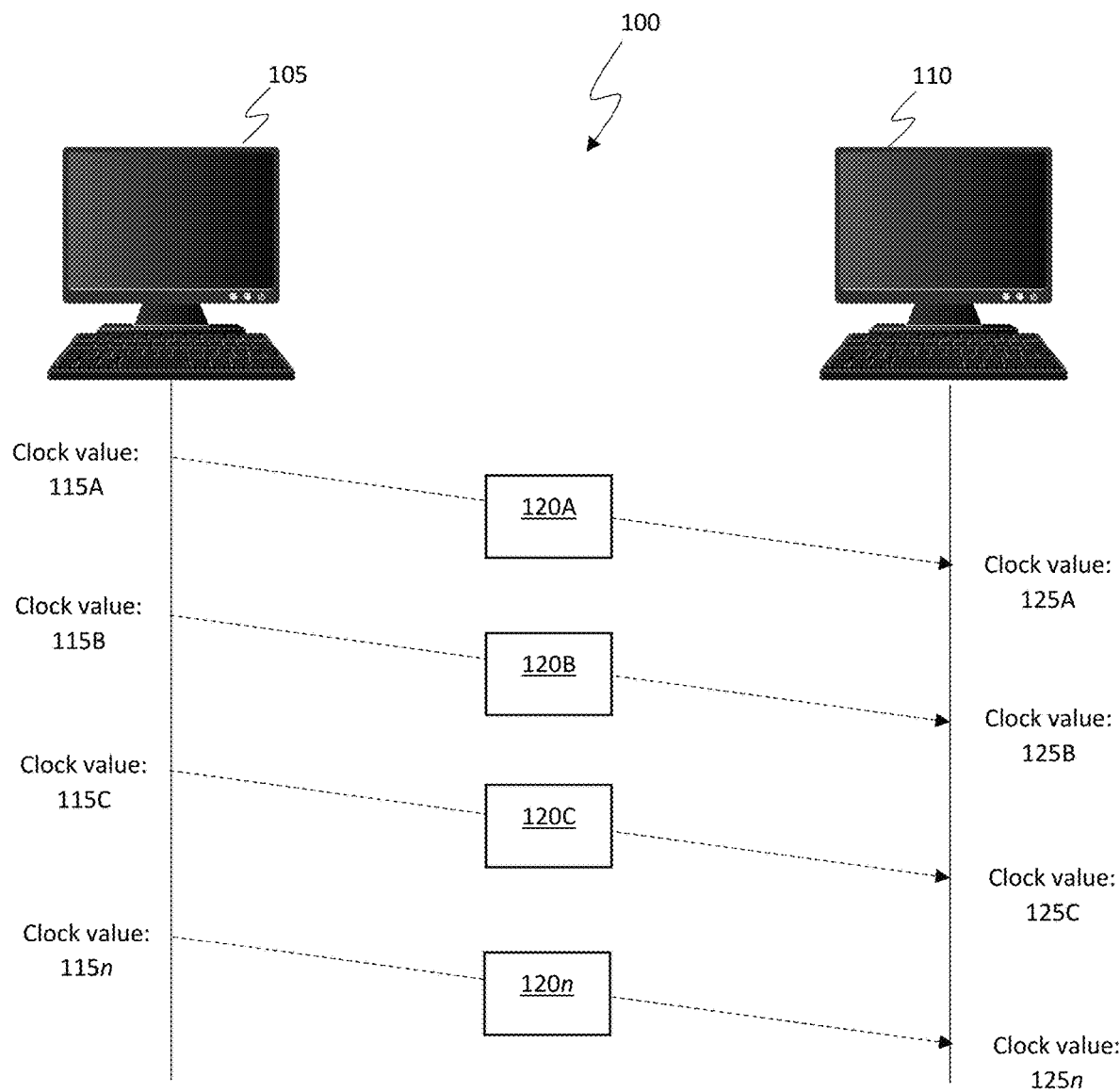
FIG. 1 is a block diagram depicting an exemplary electronic transaction performed between electronic communication systems for determining clock values of a system and for determining a relationship between clock rates of different devices according to embodiments of the present invention.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method. Although steps and sequencing thereof are disclosed in a figure herein (e.g., FIGS. 4A, 4B, 4C, 5A, and 6A) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "displaying," "writing," "including," "storing," "rendering," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Device Identification Based on Processor Clock Values and Rates

Embodiments of the present invention provide systems and methods for identifying a party to a communication and subsequently securely and reliably sending messages between multiple devices of a communications network and nodes of real-time computer systems, for example. The messages can include instructions related to transactions such as reading and/or writing data to a database, and a clock value of one or more of the devices can be used to authorize parties to the transaction, to encrypt and/or decrypt messages, and are components of a method that can guarantee that messages related to the transaction are delivered successfully. According to various embodiments, a node can be a personal computer, smartphone, cloud-based or mainframe server, appliance, Internet-of-Things (IoT) device, an automobile, wearable electronic device, etc., or any other electronic device including a processor and means of electronic communication (e.g., Wi-Fi or ethernet).

Modern multi-processor computer systems typically include one or more clocks used to keep track of time for performing important functions (e.g., OS-level functions) and operating the processor or processors efficiently. In a multi-processor system, only one clock value is typically used for encryption and system identification according to embodiments. A system clock or timer may be initialized when a system first comes online, and the clock's value (e.g., tick count) is incremented once every clock cycle. The value of the clock can be accessed by the computer's operating system (e.g., an MCP) during operation and the clock value can be represented by a clock register which can be quite large, e.g., 128 bits, which is sufficient to cover the life of the universe measured in $10^{-6}$ femtoseconds, although any suitable size can be used (e.g., 64 bits or 256 bits). Embodiments of the present invention can transmit messages that include the value of the transmitting node's clock at the time the message was transmitted.

After several such messages are transmitted by the transmitting node, the receiver node is able to construct a data table from the clock information received from the transmitting node. From this data table, the clock value and clock rate information can be determined by the receiver based on the transmitting node. This clock information can be used by the receiver to identify the transmitting node. The data table can further include GPS-based time values corresponding to the recorded system times.

The receiving node can record clock values of other nodes that are received in messages alongside the value of the clock of the receiving node at the time the messages are received. In this way, each node can be associated with an initial clock value, and the rate of each node's clock can be determined when two or more messages have been received from the same node. The transmitting node's clock rate can then be compared to the receiver node's clock rate, and a relationship between the different clock rates can be determined. According to embodiments of the present invention, the clock value and the relationship between clock rates can be used advantageously by the receiving node to verify the identity of the transmitting node, to encrypt messages transmitted between the nodes, and to guarantee message delivery between the nodes.

Embodiments of the present invention may be performed by networks of multi-processor systems, particularly loosely coupled systems. In a loosely coupled system, each CPU or node is equal to any other, and rolls are performed arbitrarily. The real-time processing capabilities of such systems can grow linearly by adding additionally CPUs.

FIG. 1 depicts an exemplary electronic transaction 100 performed between electronic communication systems 105 and 110 for determining clock rate information of the transmitting node, e.g., clock values and a relationship between clock rates according to embodiments of the present invention. The systems 105 and 110 can be processors of different computer systems connected over the internet or a dedicated service line, for example. The systems 105 and 110 include memory and one or more clocks for tracking time The clocks can be a processor clock or a global position system (GPS) based clock, for example. According to embodiments of the present invention, the clock rate/values of one system can be used advantageously by another system to confirm the identity of the system within a computer network and to recover from crashes and downtime.

Clock values of systems 105 and 110 can be recorded in a large binary register e.g., 128 bits in length with very high resolution e.g., on the order of nanoseconds or picoseconds, which may leave spare bits that can be used for other purposes. According to some embodiments, the clock value used to confirm the identity of a system within the computer network are high-resolution values that requires a relatively high degree of similarity between an estimated clock value and a reported clock value to authorize the identity of the system. According to other embodiments, a lower resolution value can be used, for example, when transmission delay or other issues lead to unreliable or inconsistent network performance, and therefore a lower degree of similarity is acceptable. The level of similarity between the estimated clock value and the reported clock value can vary dynamically in real-time based on network conditions, for example.

In the example of FIG. 1, system 105 reads the value of its clock (clock value 115A) and contemporaneously transmits a message 120A to system 110 that includes clock value 115A. System 110 receives message 120A and records clock value 115A in a memory-resident table along with the current clock value 125A of system 110. Clock value 125A is the clock value of the receiver's clock at the time of reception of the message 120A. Clock value 125A is the clock value of the receiver's clock at the time of reception of the message 120A. The table can also include a device or network address (e.g., IP address or MAC address) associated with the device and/or a transaction ID associated with a transaction to be executed. According to some embodiments, the table is also used to store the size of each message sent to or received from another node. This process can be repeated for multiple messages with all clock values being stored in a table, and an approximate mapping between the clocks of systems 105 and 110 can be determined. From this mapping, a mathematical relationship can be determined between the clock rate information of systems 105 and 110 that have been transmitted between the systems.

In one example, after several messages are received from system 105, the clock rate of system 105 may be found to be twice as fast as the clock of system 110 (e.g., x=2y). In this case, clock value 115A=clock value 125A×2, clock value 115B=clock value 125B×2, clock value 115C=clock value 125C×2, and so on for each message 120n. In this way, system 110 can preliminarily identify system 105 first according to the network or device address of system 105, and can then confirm the identity of system 110 according to its determined clock rate and/or the clock value 115n included in any message n received from system 105 using the relationship between clock value 115n and clock value 125n.

The timing of messages transmitted over a communications network is often affected by a transmission delay. Transmission delay is roughly based on the propagation delay of the communication medium and the size of the message transmitted. Generally larger messages take longer to transmit compared to smaller messages, and propagation delay remains relatively constant. When the transmission speed is very high (e.g., 6 Gbit/s) and the propagation delay is very low (e.g., 200 ps), transmission delay can be essentially ignored for the purposes of estimating the clock value of system 110. In other cases, when transmission delay is significant, the estimated clock value 115n can be adjusted based on the estimated transmission delay.

In one exemplary approach, the estimated transmission delay is determined based on the size of the received message. System 110 may further adjust clock value 115n based on estimated network traffic conditions (e.g., queueing/switching delay) at the time the message is received. In this way, system 110 can approximate the value of clock value 115 at any given time, and messages received from a network or device address associated with system 105 can be authorized according to the approximate value, with the level of accuracy required for authorization being dynamically adjustable. According to some embodiments, the estimated transmission delay is estimated based on the distance between systems, for example, the amount of time it would take to traverse the distance at the speed of light.

Figure 2:
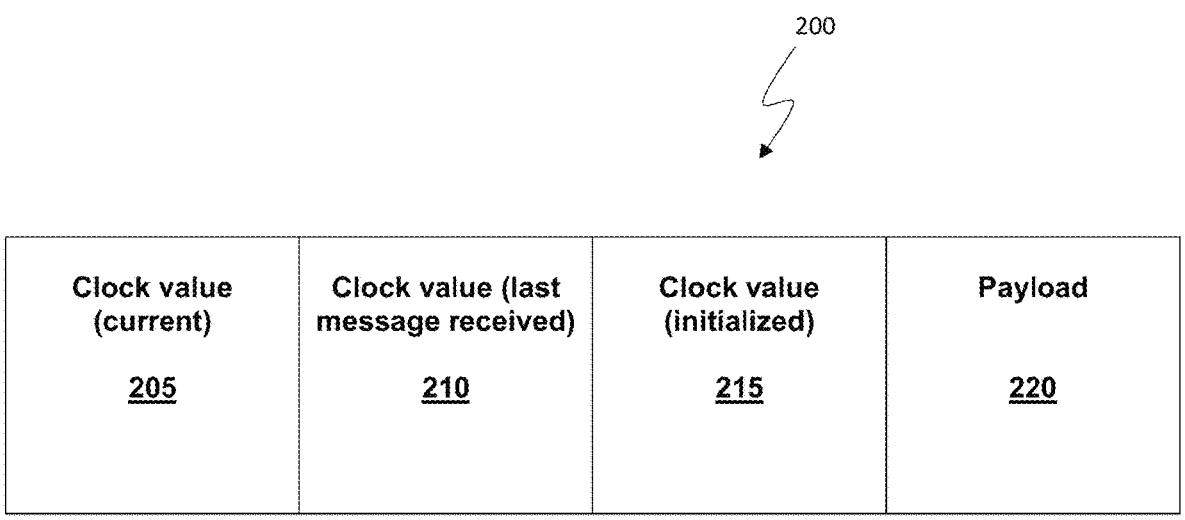
FIG. 2 depicts an exemplary message transmitted between nodes that includes a clock value for confirming the identity of a node according to embodiments of the present invention.

FIG. 2 depicts an exemplary message 200 transmitted between nodes that includes a clock value 205 for confirming the identity of the transmitting node according to embodiments of the present invention. Specifically, message 200 includes the current clock value of the transmitting node at the time message 200 is transmitted by the transmitter node (205), the clock value of the transmitting node at the time of reception of the last message received from the destination node (210), and initially the clock value of the transmitting node when the transmitting node was initialized (215). Message 200 can further include a payload 220, such as data and/or instructions for performing a transaction (e.g., a read or write operation). The clock values of message 200 can be added to a table of clock values associated with different nodes stored in the memory of the receiving device. The time values may be stored as 128-bit values, which is sufficient in most cases, as 60 bits is required to achieve an accuracy to 1/1000 of a femtosecond. To store values at this level of accuracy for 10 trillion years requires only 60 bits for the low order bits up to a second, and another 50 bits to store the high order bits up to 10 trillion years, with 18 bits of the 128 bits saved for expansion at the low end, for example.

Figure 3A:
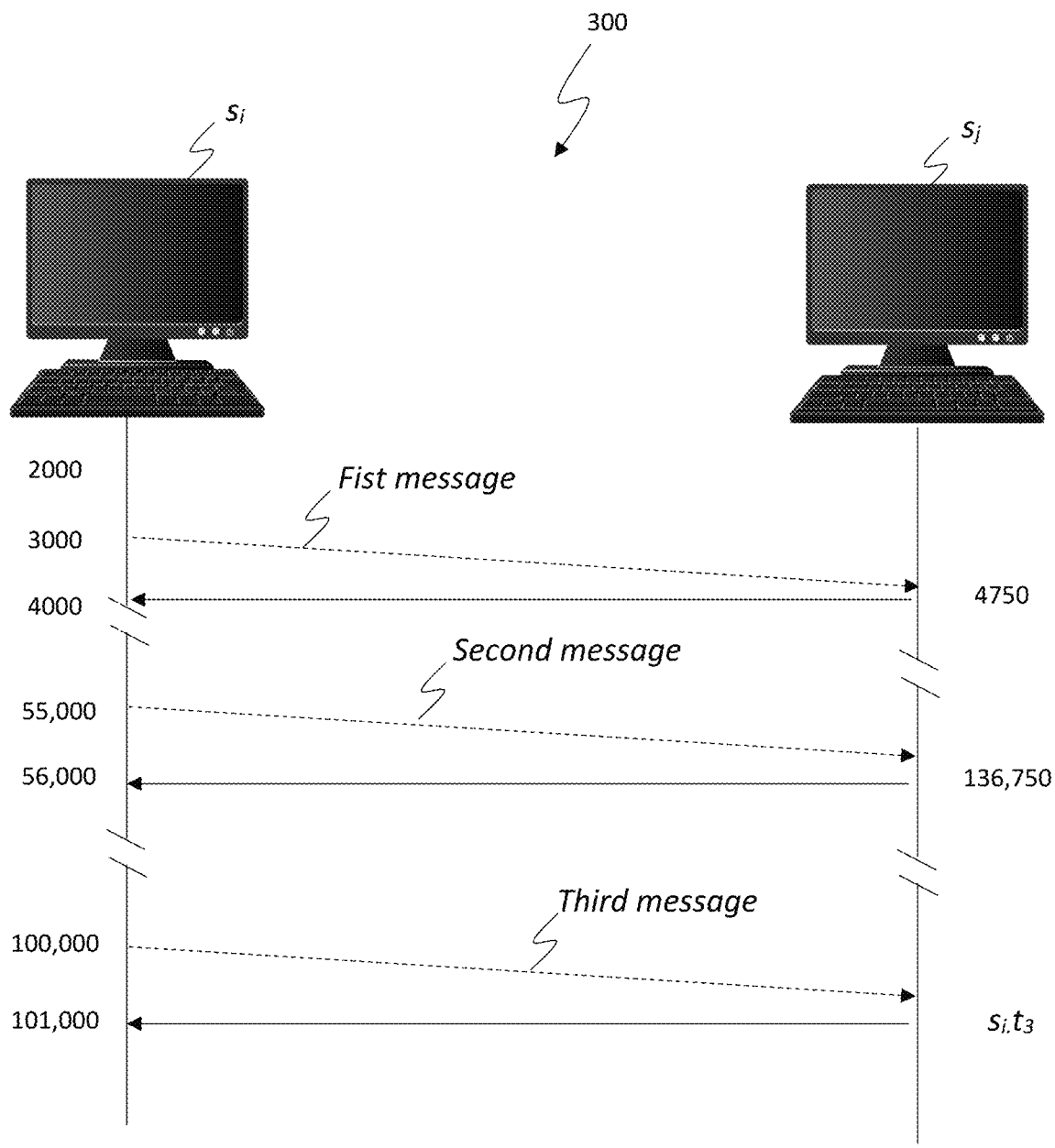
FIG. 3A is a transmission timing diagram depicting exemplary communications for performing system initialization and confirming the identify of a node in a multiprocessor system or computer network according to embodiments of the present invention.

FIG. 3A is a transmission timing diagram depicting exemplary communications 300 for performing system initialization and confirming the identify of a device of a communications network, or a node of a real-time computer network according to embodiments of the present invention.

In the example of FIG. 3A, system $s_i$ comes online and reads its initialized clock value silo which is 2000 ticks. This clock value is typically recorded in a large binary register e.g., 128-512 bits in length with very high resolution e.g., on the order of nanoseconds or picoseconds. Later, when the value of $s_i \cdot t_1$ is 3000 ticks, system $s_i$ transmits a message (e.g., an initialization request) to system $s_j$. The message includes the clock value of system $s_i \cdot t_1$ (3000 ticks) at the time of transmission. According to some embodiments, the message also includes the clock value of system $s_i$ when it first came online $s_i \cdot t_0$ (2000 ticks) and/or a network or device address associated with system $s_i$.

System $s_j$ receives the message from system $s_i$ when the clock value $s_j \cdot t_1$ is equal to 4750 ticks. This is the value of the receiver's clock at the time of reception, $t_1$. System $s_j$ transmits a reply to the message received from system $s_i$ that includes the value $s_j \cdot t_1$.

System $s_i$ later transmits a second message to system $s_j$ when the clock value $s_i \cdot t_2$ is equal to 55,000 ticks which is the value of the clock of $s_i$ at the time the second message is sent. The second message includes the clock value of system $s_i \cdot t_2$ (55,000 ticks). According to some embodiments, the message also includes the clock value of system $s_i$ when it first came online $s_i \cdot t_0$ (2000 ticks) and/or a network or device address associated with system $s_i$.

System $s_j$ receives the second message from system $s_i$ when the clock value $s_j \cdot t_2$ is equal to (136,750 ticks). This is the value of the receiver's clock at the time the second message is received. System $s_j$ transmits a reply to the message received from system $s_i$ that includes the value $s_j \cdot t_2$.

System $s_i$ later transmits a third message to system $s_j$ when the clock value $s_i \cdot t_3$ is equal to 100,000 ticks. This is receiver's clock value at the time of reception. The message includes the clock value of system $s_i \cdot t_3$ (55,000 ticks). According to some embodiments, the message also includes the clock value of system $s_i$ when it first came online silo (2000 ticks) and/or a network or device address associated with system $s_i$.

System $s_j$ receives the third message from system $s_i$ when the clock value $s_j \cdot t_3$ is equal to (251,130 ticks). System $s_j$ transmits a reply to the message received from system $s_i$ that includes the value $s_j \cdot t_3$. Si can confirm the identify of system $s_j$ by confirming that the value $s_j \cdot t_2$ is approximately equal to its estimated value of $s_j \cdot t_3$. The estimated value of $s_j \cdot t_3$ can be computed by system $s_i$ according to the clock rate determined from the prior messages as described below in Equation I:

$$sj.t3 = \frac{(sj.t2 - sj.t1)}{(si.t2 - si.t1)} \cdot (si.t3 - si.t1) + sj.t1 \qquad \text{Equation I}$$

In the example of FIG. 3A, the ratio $$\frac{(sj.t2 - sj.t1)}{(si.t2 - si.t1)}$$

is computed as:

$$\frac{136{,}750 - 4750}{55{,}000 - 3000} = \frac{132{,}000132}{52{,}000} = 2.538.$$

Applied to Equation I, $s_j \cdot t_3$=2.538 (100,000−3000)+ 4750=246,186. Accordingly, system $s_i$ can confirm the identity of system $s_j$ according to the reported clock time $s_j \cdot t_3$ when system $s_j$ received the third message transmitted by system $s_i$. In other words, the receiver can use its clock value at the time of message reception and the computer rate relationship between the sender's clock and the receiver's clock to computer an expected time value of the sender's clock at the time of message transmission. This expected clock value can be compared to the value of the sender's clock as reported in the sender's communication. If the values match with an agreed threshold, then the identity of the sender can be authenticated. In the given example, if the clock time $s_j \cdot t_3$ is substantially similar to the value of $s_j \cdot t_3$ estimated using Equation I, then the identity of system $s_j$ is considered confirmed/authorized. Otherwise, the third message is considered unauthorized. Moreover, the requisite threshold of similarity between the estimated value and the reported value can be adjusted in real-time.

Figure 3B:
FIG. 3B is a block diagram of exemplary data tables constructed based on the exemplary messages of FIG. 3A according to embodiments of the present invention.

FIG. 3B is a diagram depicting an exemplary memory-resident data structure for storing clock values used to authorize a party to an electronic transaction according to embodiments of the present invention. Data structure 350 is stored in a memory of computer system $s_i$ and includes the clock value when system $s_i$ first booted and times $t_1$, $t_2$, and $t_3$ associated with the respective messages transmitted in FIG. 3A. Data structure 350 stores clock values associated with each message transmitted between system $s_i$ and $s_j$. In the example of FIG. 3B, system $s_i$ stores the clock value of system $s_i$ when a message is transmitted by system $s_i$ and the clock value of system $s_j$ when the message is received by system $s_j$. Based on the clock values stored in data structure 350, system $s_i$ can compute an estimated clock value $s_j \cdot t_3$ as described herein according to embodiments of the present invention, which can be used to authorize system $s_j$ to execute a transaction between system $s_i$ and $s_j$.

Figure 4A:
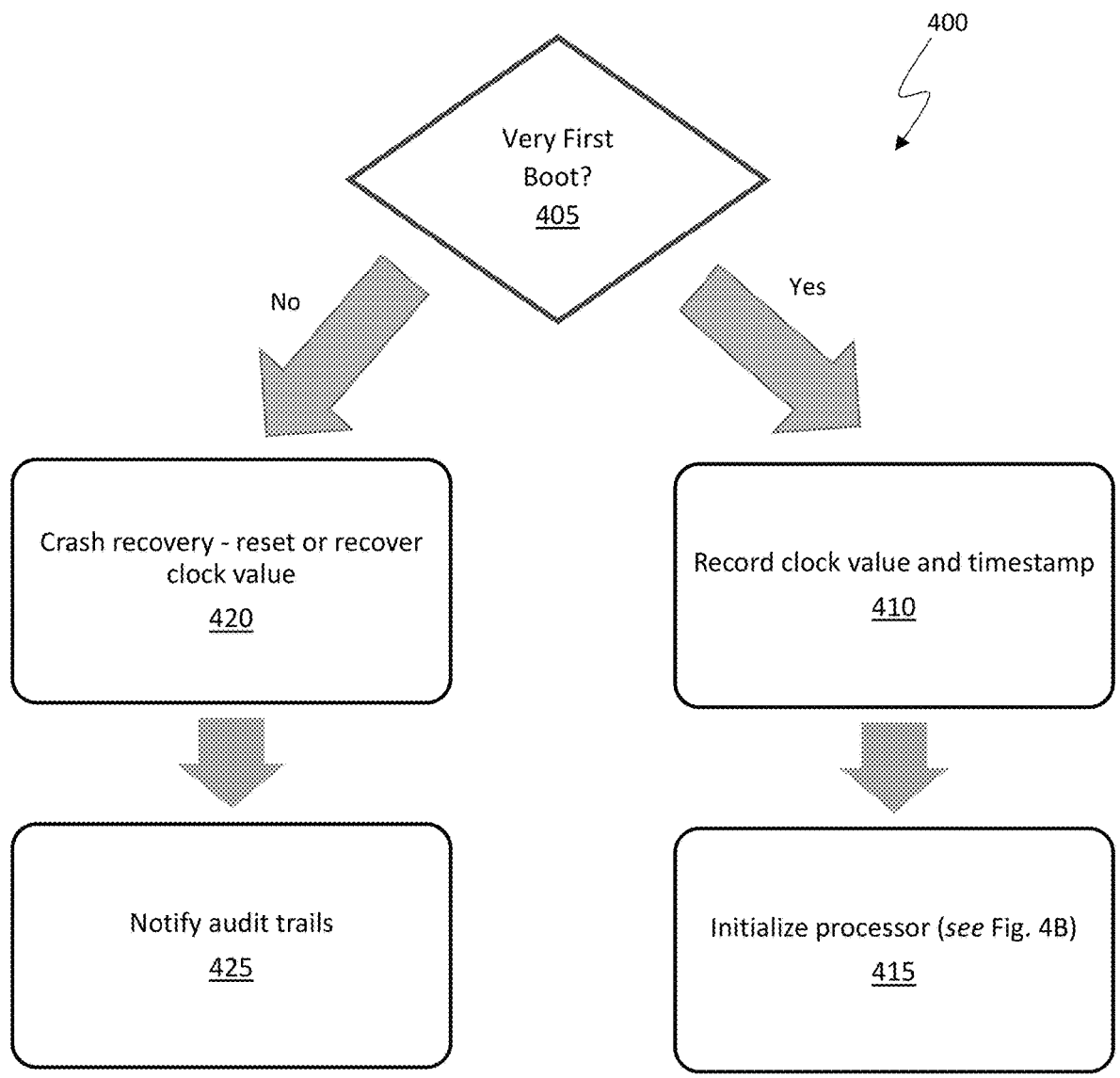
FIG. 4A is a flow chart depicting computer implemented steps of a process for automatically performing system initialization or recovery according to embodiments of the present invention.

FIG. 4A is a flow chart depicting an exemplary sequence of computer implemented steps 400 that are executed by a processor upon booting for performing secure transmissions between nodes according to embodiments of the present invention. Steps 400 can be performed to recover a system when it crashes, in which case the processor or O/S clock of the system will stop ticking and may need to be reset or recovered.

At step 405, system $s_i$ determines if it is coming online for the first time. If it is not coming online for the first time system $s_i$ is likely in crash recovery.

If it is determined that system $s_i$ is coming online for the first time, at step 410, system $s_i$ records the value of its processor clock at first boot and the equivalent Julian timestamp and performs initialization at step 415.

If system $s_i$, determines that it is recovering from a crash, a crash recovery procedure is performed and the clock value of system $s_i$, is reset at step 420.

If the processor or O/S clock needs to be recovered, system $s_i$ can notify all audit trails and initialize a new processor clock at step 425.

Figure 4B:
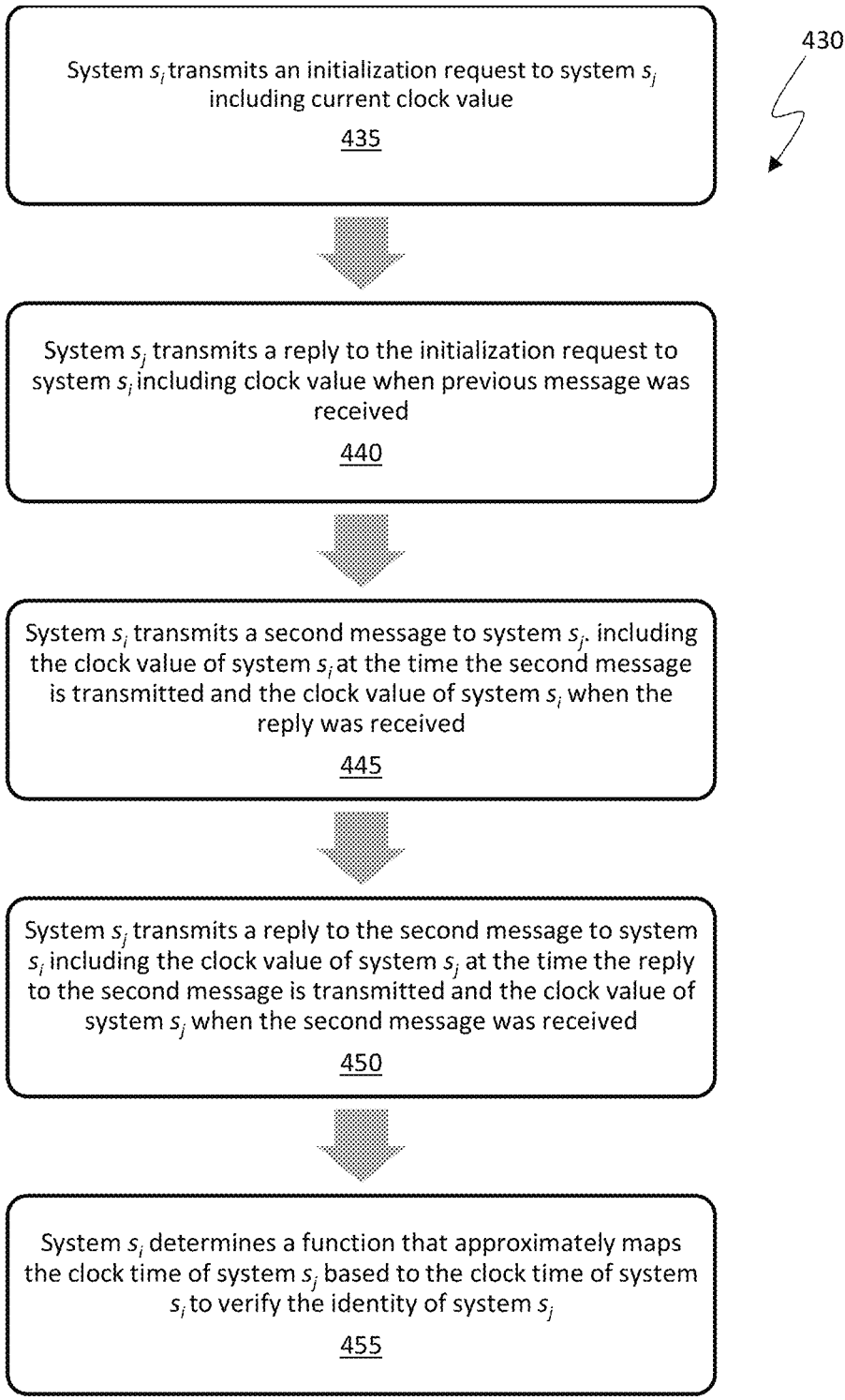
FIG. 4B is a flow chart depicting computer implemented steps of a process for determining a relationship between clock values to automatically confirm the identify of a computer network according to embodiments of the present invention.

FIG. 4B is a flow chart depicting an exemplary sequence of computer implemented steps 430 that are executed by a processor to automatically initialize the processor for performing secure transmissions between nodes according to embodiments of the present invention.

At step 435, system $s_i$ transmits an initialization request message to system $s_j$, where $s_i$ and $s_j$ are computer systems connected over a communication network, e.g., the internet or nodes of a leased line network, for example. The initialization request message includes the clock value of system $s_i$ at the time the initialization request is transmitted over the internet.

At step 440, system $s_j$ records the clock value of the request message and transmits a reply to the initialization request that is received by system $s_i$. The reply includes the clock value of system $s_j$ at the time the reply is transmitted and the clock value of system $s_j$ when the initialization request was received.

At step 445, system $s_i$ transmits a second message to system $s_j$. The second message includes the clock value of system $s_i$ at the time the second message is transmitted and the clock value of system $s_i$ when the reply was received by system $s_i$. System $s_j$ records the clock values of the second message.

At step 450, system $s_j$ transmits a reply to the second message that is received by system $s_i$. The reply includes the clock value of system $s_j$ at the time the reply to the second message is transmitted and the clock value of system $s_j$ when the second message was received. System $s_i$ records the clock values of the reply to the second message.

At step 455, system $s_i$ uses to recorded clock values from system $s_j$ to determine a function that approximately computes the clock time of system $s_j$ based the clock time of the reception of the last message of system $s_i$. System $s_i$ can then confirm the identify of system $s_j$ when subsequent messages are transmitted to system $s_j$ based on a comparison of the estimated clock time for system $s_j$ and the actual reported clock time for system $s_j$.

Figure 4C:
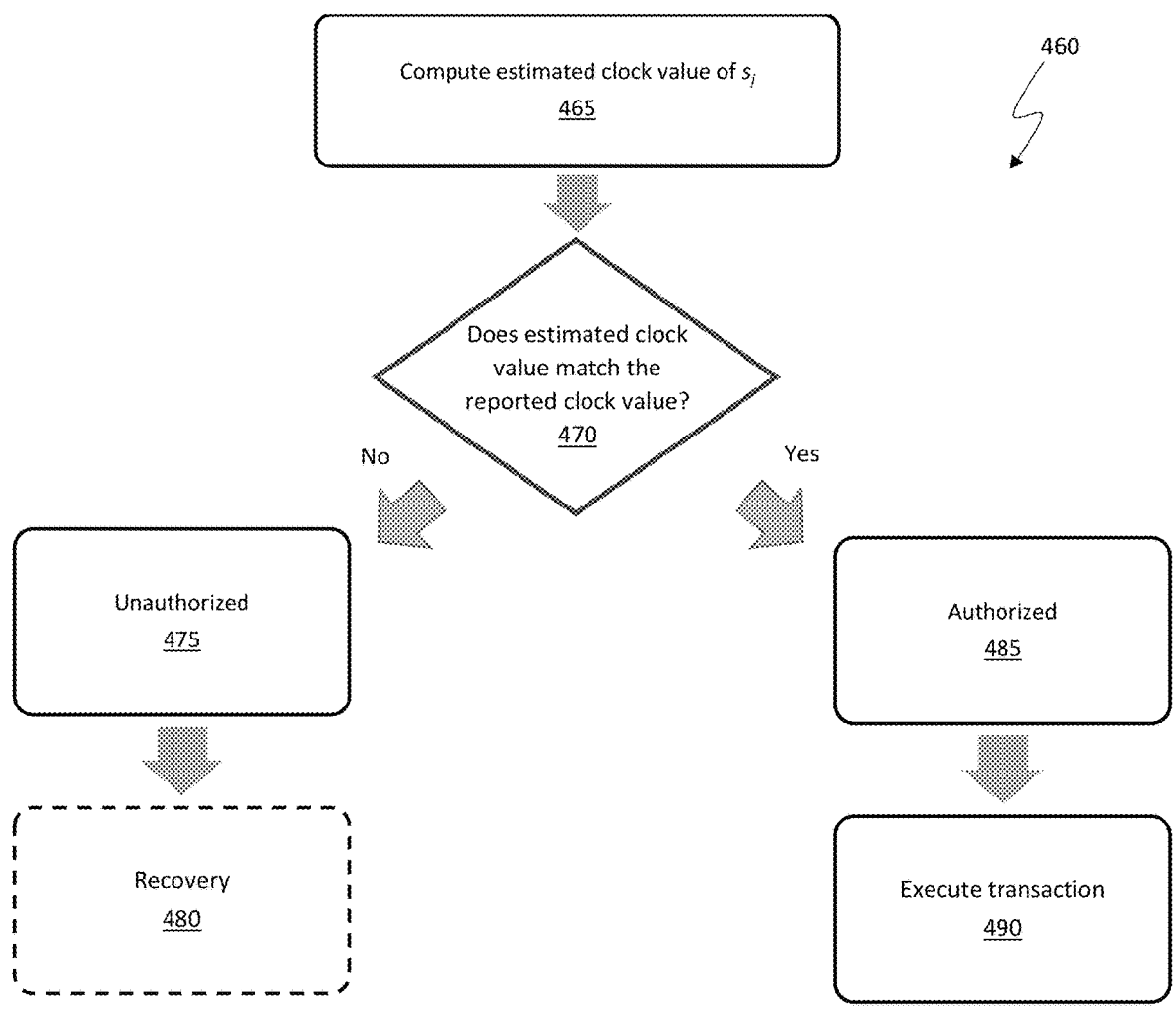
FIG. 4C is a flow chart depicting computer implemented steps of a process for automatically confirming the identify of a node in a computer network based on clock values according to embodiments of the present invention.

FIG. 4C is a flow chart depicting an exemplary sequence of computer implemented steps 460 that are executed by a processor to automatically authorize a party to an electronic transaction according to embodiments of the present invention.

At step 465, system $s_i$ computes an estimated clock value of system $s_j$ as described above according to embodiments of the present invention, where $s_i$ and $s_j$ are computer systems connected over a communication network, e.g., the internet, or nodes of a private network system, for example.

At step 470, system $s_i$ determines if the estimated clock value of system $s_j$ substantially matches a clock value reported by system $s_j$.

At step 475, system $s_i$ determines that the transaction is not authorized if the estimated clock value of system $s_j$ does not match the clock value reported by system s 1.

At step 480, system $s_i$ can optionally perform recovery to correct the clock value of system $s_j$, for instance, if system $s_j$ is recovering from a crash.

At step 485, system $s_i$ determines that the transaction is authorized if the estimated clock value of system $s_j$ substantially matches the clock value reported by system $s_j$.

At step 490, the transaction communicated between system $s_i$ and system $s_j$ is executed, which may include updating a database and/or transmitting additional messages, for example.

Message Encryption Between Nodes Using Estimated Clock Values

According to some embodiments of the present invention, messages transmitted between nodes can be automatically encrypted before transmission according to an estimated clock value of the message recipient as estimated by the sender and at the time the message is received. In the simple example described above, after sending and receiving two pairs of messages with another node, a sender node can estimate the arrival time of a subsequent message according to the clock of the recipient according to Equation I:

$$sj.t3 = \frac{(sj.t2 - sj.t1)}{(si.t2 - si.t1)} \cdot (si.t3 - si.t1) + sj.t1$$

As the exact arrival time as measured by the receiving node is known by the receiving node, and the estimated arrival time at the receiving node can be calculated by the transmitting node, the estimated arrival time of the message can be used by the transmitting node to encrypt the message, and the receiving node can use the exact arrival time to decrypt the message assuming the estimated and actual clock values (time) match sufficiently. As more messages are transmitted between the nodes, the accuracy of the estimated arrival time may become more accurate. The message size and/or transmission delay of the message can be used to adjust the estimated arrival time for a more accurate estimate.

Figure 5A:
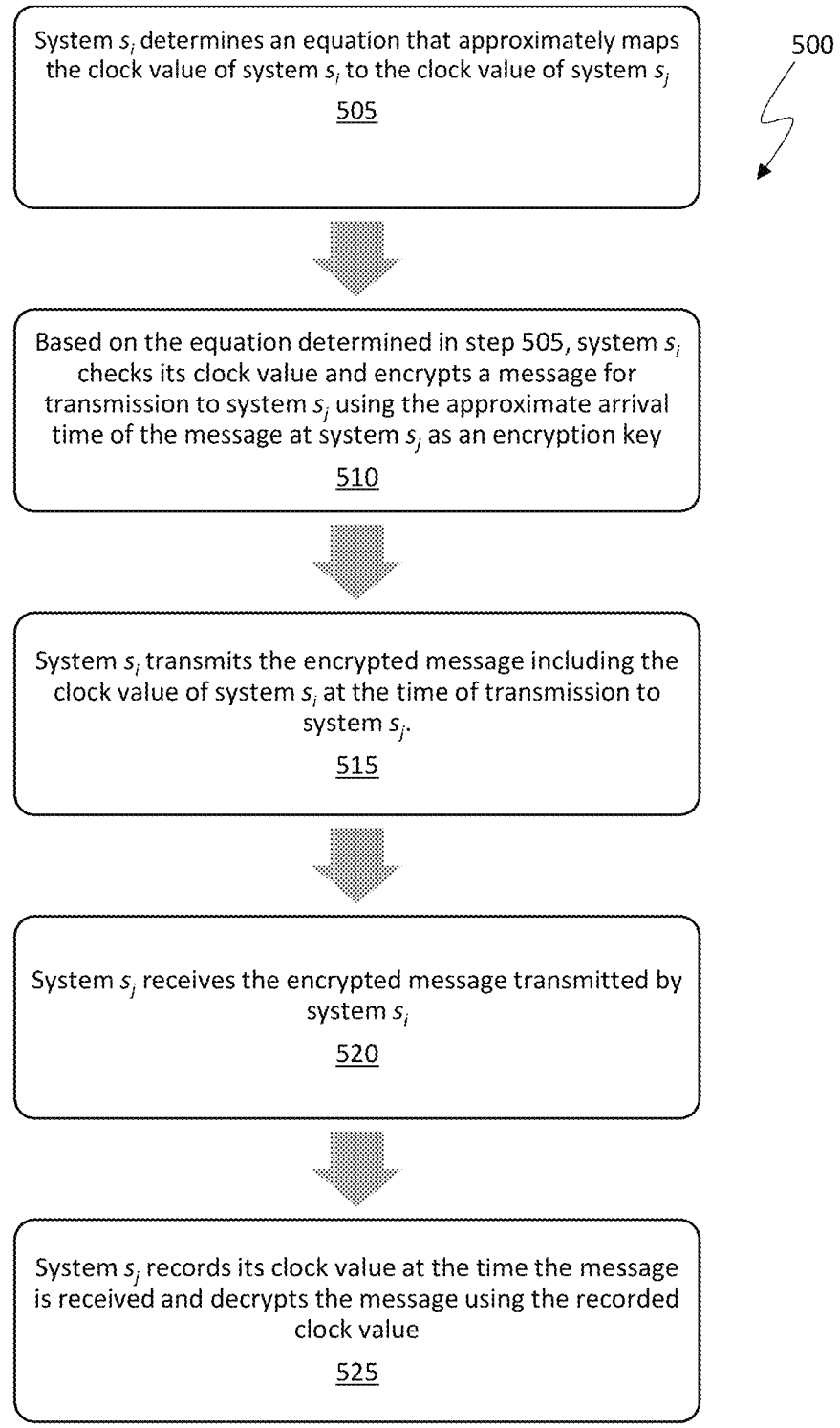
FIG. 5A is a flowchart depicting computer implemented steps of a process for automatically performing encryption and decryption of a message based on a relationship between clock values of different nodes according to embodiments of the present invention.

FIG. 5A is a flow chart depicting an exemplary sequence of computer implemented steps 500 that are executed by a processor to securely encrypt and decrypt transmissions between two nodes $s_i$ and $s_j$ according to an estimated clock value when a message is received according to embodiments of the present invention, as briefly described above.

At step 505, system $s_i$ determines an equation that approximately maps the clock value of system $s_i$ to the clock value of system $s_j$ as described above according to exemplary embodiments of the present invention. This step will involve several message sent between the systems that carry the clock values as described with reference to FIGS. 4A, 4B, and 4C.

At step 510, system $s_i$ checks its clock value and computes an estimated clock value of system $s_j$ at the time the message will arrive at system $s_j$ and encrypts the message using the estimated arrival time of the message at system $s_j$ as an encryption key. For example, if the relationship that maps the clock value of system $s_i$ to the clock value of system $s_j$ is $s_j=2\ s_i$, and the clock value of $s_i$ at the time the message is encrypted is 1000, the estimated clock value of $s_j$ used as the encryption key is 2000, assuming contemporaneous transmission. According to some embodiments, the 2000 tick estimate can be adjusted based on message size, transmission delay, network traffic conditions, etc.

At step 515, system $s_i$ transmits the encrypted message including the clock value of system $s_i$ at the time of transmission to system $s_j$.

At step 520, system $s_j$ receives the encrypted message transmitted by system $s_i$.

At step 525, system $s_j$ records its clock value at the time the message is received (e.g., in a memory-resident table) and decrypts the received message using the stored clock value at the time of arrival. The decrypted message may include a payload, such as instructions for modifying a database (e.g., a read or write instruction) and/or one or more values, addresses, etc.

Figure 5B:
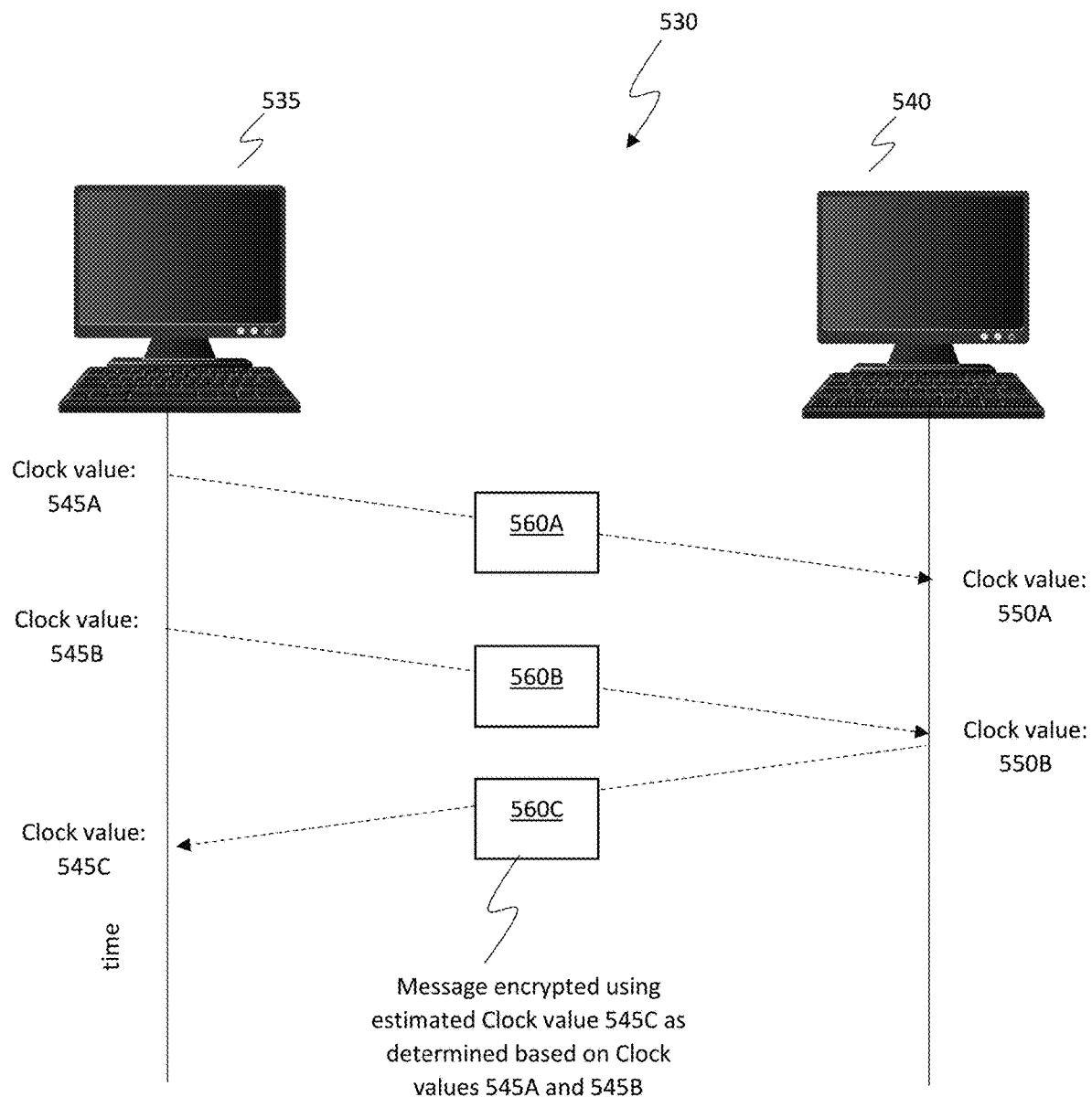
FIG. 5B is a block diagram of an exemplary communication between computer systems for transmitting a message encrypted using an estimated clock value according to embodiments of the present invention.

FIG. 5B is a block diagram of an exemplary communication between computer systems 535 and 540 for transmitting a message encrypted using an estimated clock value according to embodiments of the present invention. Similar to the example in FIG. 1 above, systems 535 and 540 can be processors of computer systems connected over the internet or a dedicated service line, for example. The systems 535 and 540 include memory and one or more clocks for tracking time The clocks can be a processor clock, a GPS clock, or an operating system clock, for example. According to embodiments of the present invention, the clock rate/values of one system can be used advantageously by another system to confirm the identity of the system within a computer network and to recover from crashes and downtime. The clock values can be represented in a binary register and can be 128-bit, 256-bit, or 512-bit, for instance.

Clock values of systems 535 and 540 can be recorded in a large binary register e.g., 128 bits in length as described above with very high resolution e.g., on the order of nanoseconds or picoseconds. According to some embodiments, the clock value used to confirm the identity of a system within the computer network are high-resolution values that requires a relatively high degree of similarity between an estimated clock value and a reported clock value to authorize the identity of the system. According to other embodiments, a lower resolution value can be used, for example, when transmission delay or other issues lead to unreliable or inconsistent network performance, and therefore a lower degree of similarity is acceptable. The level of similarity between the estimated clock value and the reported clock value can vary dynamically in real-time based on network conditions, for example.

In the example of FIG. 5B, system 535 reads the value of its clock (clock value 545A) and contemporaneously transmits a message 560A to system 540 that includes clock value 545A as a field in message 560A. System 540 receives message 560A and records clock value 545A in a memory-resident table along with the current clock value 550A of system 540. Clock value 550A is the clock value of the receiver's clock at the time of reception of the message 560A at system 540. Clock value 550A is the clock value of the receiver's clock at the time of reception of the message 560A. The table can also include a device or network address (e.g., IP address or MAC address) associated with the device and/or a transaction ID associated with a transaction to be executed. According to some embodiments, the table is also used to store the size of each message sent/received to/from another node. This process can be repeated for multiple messages (560B) with all clock values being stored in a memory-resident table, and an approximate mapping between the clocks of systems 535 and 540 can be determined in this fashion. From this mapping, a mathematical relationship can be determined between the clock rate information of systems 535 and 540 that have been transmitted between the systems, and the determined mathematical relationship can be used to estimate clock value 545C just before message 560C is transmitted.

System 540 encrypts message 560C prior to transmission using an encryption key based on estimated clock value 545C. This value 545C is the estimated clock value of the receiver's clock at the time the message 560C is received at 535. The encrypted message is securely transmitted to system 535 and the contents thereof cannot be read or understood by another system without first decrypting message 560C. When message 560C is received by system 535, system 535 decrypts the message using it's actual clock value 545C of the arrival time of message 560C. The message can be encrypted using a 64-bit or 128-bit encryption key, for example.

Figure 6A:
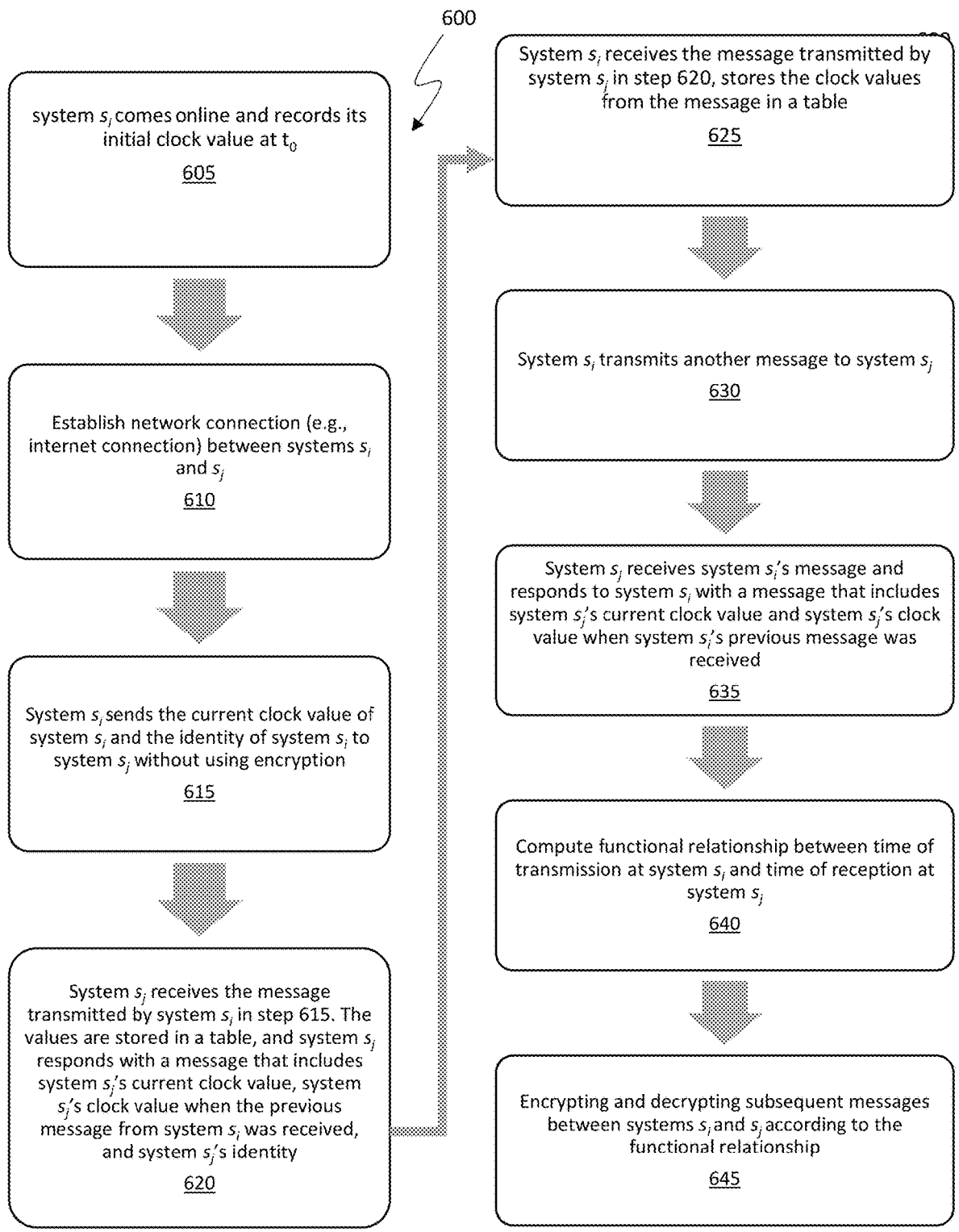
FIG. 6A is a flow chart depicting an exemplary sequence of computer implemented steps that are executed by a processor to transmit a message encrypted using an estimated clock value when systems $s_i$ and $s_j$ are initially offline according to embodiments of the present invention.
Figure 6B:
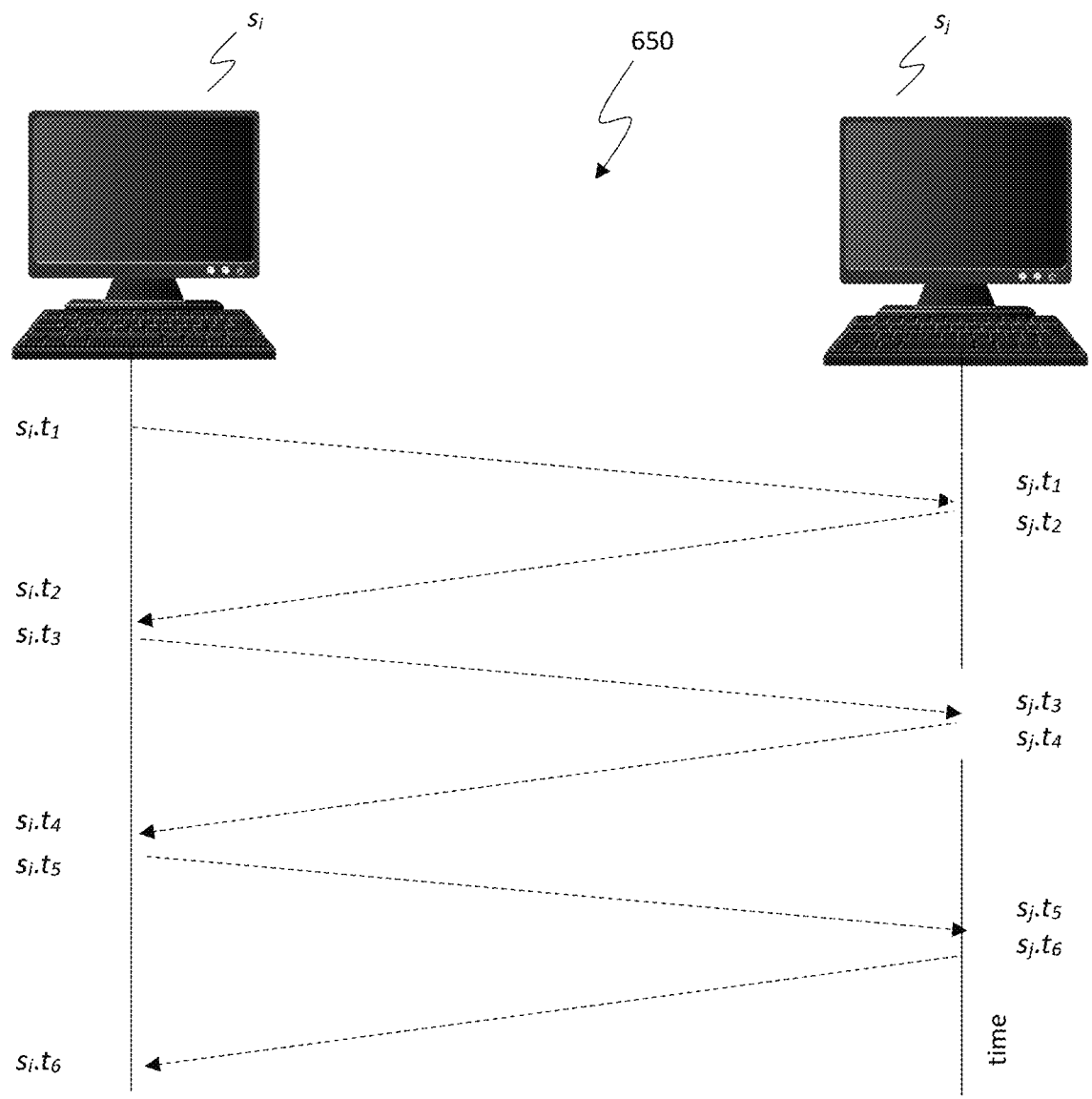
FIG. 6B is a transmission timing diagram that depicts the messages transmitted by the steps of FIG. 6A according to embodiments of the present invention.

FIG. 6A is a flow chart depicting an exemplary sequence of computer implemented steps 600 that are executed by a processor to transmit a message encrypted using an estimated clock value when systems $s_i$ and $s_j$ are initially offline according to embodiments of the present invention. FIG. 6B is a transmission timing diagram that depicts the messages 650 transmitted by steps 600 of FIG. 6A according to embodiments of the present invention.

At step 605, system $s_i$ comes online and records its initial clock value at $t_0$. This clock value is used as an identifier ("ID") of system $s_i$. All other systems (e.g., system $s_j$) obtain their IDs in the same way, by recording their initial clock value when they first come online. Along with the initial time, a local GPS time and geographic location can also be recorded.

At step 610, a network connection (e.g., internet connection) between systems $s_i$ and $s_j$ are established. Subsequence messages transmitted between the systems are carried in an internet packet (e.g., TCP-IP).

At step 615, system $s_i$ sends the current clock value of system $s_i$ ($s_i \cdot t_1$) and the identity of system $s_i$ ($s_i \cdot t_0$) to system $s_j$ without using encryption.

At step 620, system $s_j$ receives the message transmitted by system $s_i$ in step 615. The values of $s_i \cdot t_0$ and $s_i \cdot t_1$ are stored in a table, and system $s_j$ responds with a message that includes system $s_j$'s current clock value ($s_j \cdot t_2$), system $s_j$'s clock value when the previous message from system $s_i$ was received ($s_j \cdot t_1$), and system $s_j$'s identity (sj·t$_0$).

At step 625, system $s_i$ receives the message transmitted by system $s_j$ in step 620 at $s_i \cdot t_2$, stores the clock values from the message in a table (e.g., $s_j \cdot t_0$, $s_j \cdot t_1$, and $s_j \cdot t_2$).

At step 630, at a later time, system $s_i$ transmits another message to system $s_j$ that is received at $s_j \cdot t_3$.

At step 635, system $s_j$ receives system $s_i$'s message at time $s_j \cdot t_4$, and responds to system $s_i$ with a message that includes system $s_j$'s current clock value ($s_j \cdot t_4$) and system $s_j$'s clock value when system $s_i$'s previous message was received ($s_j \cdot t_3$).

At step 640, a functional relationship between the time of transmission at system $s_i$ ($s_i \cdot tx$) and the time of reception at system $s_j$ ($s_j \cdot tx$) can be established. In the same way, a functional relationship between the time of transmission at system $s_j$ ($s_j \cdot tx$) and the time of reception at system $s_i$ ($s_i \cdot tx$) can be established. In this way, at step 645, a message can be encrypted using the estimated clock value of the receiving system when the message will be received based on the functional relationship determined in this step, and the receiving system can decrypt the message using their actual clock value at the time of reception.

In the example of FIG. 6A, the clock value $s_j \cdot t_5$ can be estimated from the previous clock values transmitted between system $s_i$ and system $s_j$ for encryption as follows:

$$sj.t5 = \frac{sj.t3 - sj.t1}{si.t3 - si.t1}(si.t5 - si.t1) + sj.t1$$

The clock value $s_j \cdot t_6$ can be estimated from the previous clock values transmitted between system $s_i$ and system $s_j$ for encryption as follows:

$$si.t6 = \frac{si.t4 - si.t2}{sj.t4 - sj.t2}(sj.t6 - sj.t2) + sj.t1$$

The receiving system the decrypts the message using their actual clock value, which is substantially similar to the estimated clock value used by the transmitting system for encryption purposes.

Exemplary Computer System

Embodiments of the present invention are drawn to computer systems that can uniquely identify parties to transactions and encrypt messages based on clock values without requiring burdensome encryption or authorization protocols. The following discussion describes such exemplary computer systems.

Figure 7:
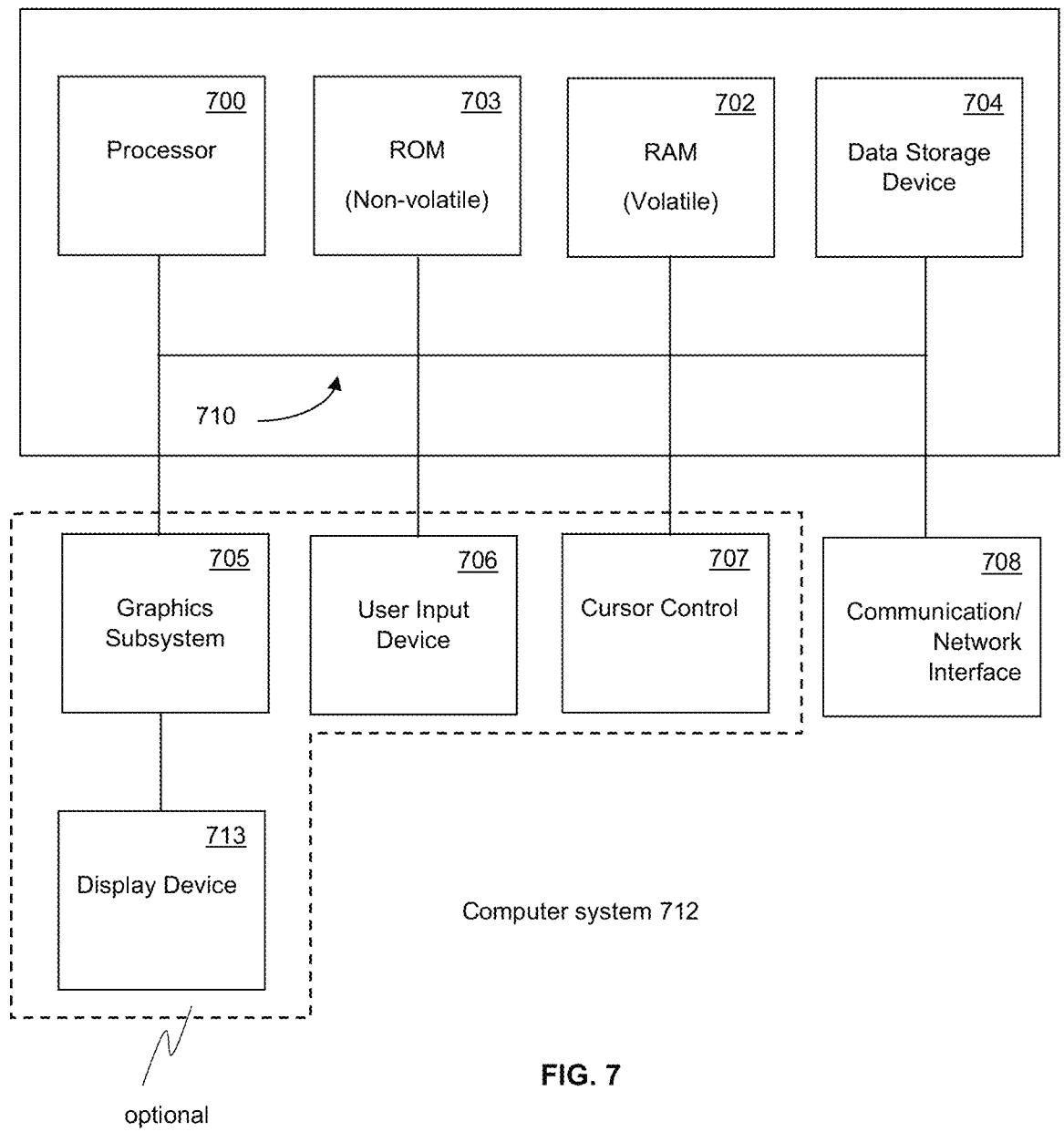
FIG. 7 is a block diagram of an exemplary computer system upon which embodiments of the present invention may be implemented.

In the example of FIG. 7, the exemplary computer system 712 includes a central processing unit (CPU) 701 for running software applications and optionally an operating system=. Computer 712 can be a personal computer or a node of a multiprocessor system for example. Random access memory 702 and read-only memory 703 store applications and data for use by the CPU 701. Data storage device 504 provides non-volatile storage for applications and data and may include fixed disk drives, removable disk drives, flash memory devices, and CD-ROM, DVD-ROM or other optical storage devices. The optional user inputs 706 and 707 comprise devices that communicate inputs from one or more users to the computer system 712 (e.g., mice, joysticks, cameras, touch screens, and/or microphones).

A communication or network interface 708 allows the computer system 712 to communicate with other computer systems, networks, or devices via an electronic communications network, including wired and/or wireless communication and including an Intranet or the Internet. Communication or network interface 708 can include fast interconnects for communications between nodes. The display device 713 (optional) may be any device capable of displaying visual information in response to a signal from the computer system 712. The components of the computer system 712, including the CPU 701, memory 702/703, data storage 704, user input devices 706, and graphics subsystem 705 may be coupled via one or more data buses 700.

Figure 8:
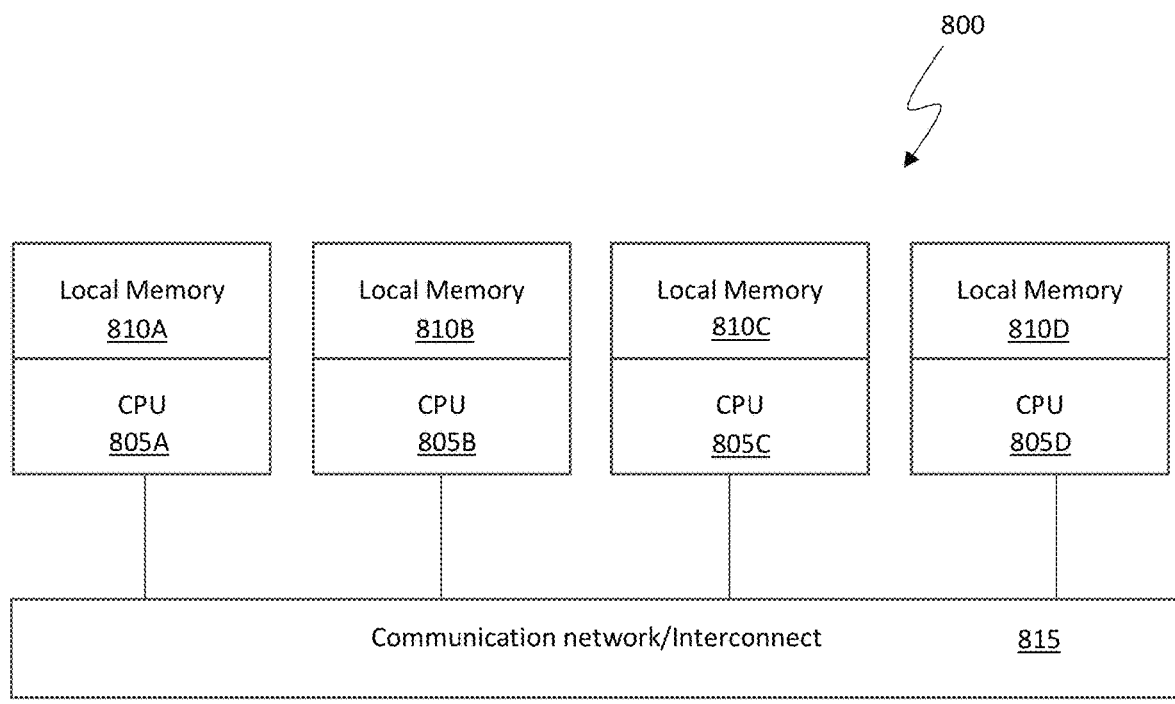
FIG. 8 is a block diagram depicting an exemplary multi-processor system (e.g., a loosely coupled multi-processor system) upon which embodiments of the present invention may be implemented.

FIG. 8 depicts an exemplary loosely coupled or distributed multi-processor network of systems 800 that can uniquely identify parties to transactions and encrypt messages based on clock values according to embodiments of the present invention. Each CPU 805A, 805B, 805C, and 805D is coupled to communication network or interconnect 815 and includes its own respective local memory 810A, 810B, 810C, and 810D. The CPUs can be configured to perform rolls arbitrarily and each CPU is considered equal to each other (e.g., equal resource allocation, priority, etc.), and the real-time processing capabilities of system 800 can grow linearly by adding additionally CPUs. Each CPU can further include a channel and arbitrator switch (CAS) to communicate over communication network 815, as well as one or more input/output device. Communication network 815 can be a message transfer system (MTS), for example.

Embodiments of the present invention are thus described. While the present invention has been described in particular embodiments, it should be appreciated that the present invention should not be construed as limited by such embodiments, but rather construed according to the following claims.

What is claimed is:

1. A method of automatically identifying a party to an electronic communication in a computer network, the method comprising:

at a first computer system, receiving a first message comprising a first clock value of a second computer system;

storing the first clock value of the second computer system and a first clock value of the first computer system representing an arrival time of said first message at said first computer system in a memory of the first computer system;

subsequent to receiving the first message, at the first computer system, receiving a second message comprising a second clock value of the second computer system;

storing the second clock value of the second computer system and a second clock value of the first computer system representing an arrival time of said second message at said first computer system in the memory of the first computer system;

determining a function that relates clock rates of said first and second computer systems based on clock values of said memory; and using said function and a time of receipt of a third message from said second computer system and a recorded clock value of said third message to authenticate said second computer system.

2. The method of claim 1, wherein said using comprises:
at the first computer system, receiving a third message comprising a reported third clock value of the second computer system;
using the function and a third clock value of the first computer system to estimate an estimated third clock value of the second computer system and a third message to authenticate said second computer system; and
verifying an identity of the second computer system when the estimated third clock value of the second computer system is substantially similar to the reported third clock value of the second computer system.

3. The method of claim 2, further comprising adjusting the estimated third clock value based on an estimated transmission delay of the computer network.

4. The method of claim 2, further comprising adjusting the estimated third clock value based on a message size of the third message.

5. The method of claim 2, further comprising adjusting the estimated third clock value based on a distance between the first computer system and the second computer system.

6. The method of claim 1, further comprising:
determining that the second computer system has crashed; and
performing a recovery procedure on the second computer system responsive to the determining that the second computer system has crashed.

7. The method of claim 1, wherein the clock values of said first and second computer systems are stored in a memory-resident table of the first computer system, and wherein said first clock value of said second computer system represents a clock value of said second computer system at a time of transmission of said first message and wherein further said second clock value of said second computer system represents a clock value of said second computer system at a time of transmission of said second message.

8. A method of automatically identifying a party to an electronic communication in a computer network, the method comprising:
transmitting a first message from a first computer system for receipt by a second computer system over the computer network, wherein the first message comprises a first clock value of the first computer system at a time of transmission of the first message;
receiving a first reply message from the second computer system at the first computer system over the computer network, wherein the first reply message comprises a first clock value of the second computer system at a time the first message was received by the second computer system;

subsequent to transmitting the first message, transmitting a second message from the first computer system for receipt by the second computer system over the computer network, wherein the second message comprises a second clock value of the first computer system at a time of transmission of the second message and a third clock value of the first computer system at a time of reception of the first reply message;

receiving a second reply message from the second computer system at the first computer system, wherein the second reply message comprises: a second clock value of the second computer system at a time of transmission of the second reply; and a third clock value of the second computer system at a time of reception of the second message;

determining a mathematical relationship between a clock of the first computer system and a clock of the second computer system based on the first message, the second message, the first reply message, and the second reply message; and based on receipt of a new message from said second computer system, said relationship, and an arrival time of said new message at said first computer system, authenticating said second computer system.

9. The message of claim 8, wherein said authenticating comprises:
transmitting a third message from the second computer system to the first computer system;
computing an estimated clock value at an arrival time of the third message based on the mathematical relationship;
accessing a reported clock value of said second computer system at the transmission time of the third message from the second computer system; and
verifying an identity of the second computer system when the estimated clock value at the arrival time of the third message is substantially equivalent to the reported clock value at the transmission time of the third message.

10. The method of claim 9, further comprising adjusting the estimated clock value at the arrival time of the third message based on an estimated transmission delay of the computer network.

11. The method of claim 9, further comprising adjusting the estimated clock value at the arrival time of the third message based on a message size of the third message.

12. The method of claim 8, wherein the first computer system and the second computer system comprise nodes of a loosely coupled multiprocessor system.

13. The method of claim 8, further comprising:
determining that the second computer system has crashed; and
performing a recovery procedure on the second computer system responsive to the determining that the second computer system has crashed.

14. The method of claim 8, wherein the clock values of the first and second computer systems are stored in a memory-resident table of said first computer system.

15. An apparatus for secure electronic communications, the apparatus comprising:
a first node comprising: a first processor; a first processor clock; and a first memory, said first node in communication with a second node comprising: a second processor; a second processor clock; and a second memory, and wherein the first processor is operable to:
receive a first message comprising a first clock value of a second computer system;

store the first clock value of the second processor and a first clock value of the first processor representing an arrival time of said first message at said first processor in a memory of the first processor;

subsequent to receiving the first message, receive a second message comprising a second clock value of the second processor;

store the second clock value of the second processor and a second clock value of the first processor representing an arrival time of said second message at said first node in the first memory of the first node;

determine a function that relates clock rates of said first and second processors based on clock values of said memory; and using said function and a time of receipt of a third message from said second node and a recorded clock value of said third message to authenticate said second node.

16. The apparatus of claim 15, wherein the first processor is further operable to:

receive a third message comprising a reported third clock value of the second computer system;

use the function and a third clock value of the first processor to estimate an estimated third clock value of the second processor and a third message to authenticate said second node; and verify an identity of the second node when the estimated third clock value of the second processor is substantially similar to the reported third clock value of the second processor.

17. The apparatus of claim 16, wherein the first processor is further operable to adjust the estimated third clock value based on an estimated transmission delay between the first node and the second node.

18. The apparatus of claim 15, wherein the first node and the second node comprise nodes of a loosely coupled multiprocessor system.

19. The apparatus of claim 15, wherein the first processor is further operable to:

determine that the second computer system has crashed; and perform a recovery procedure on the second computer system responsive to determining that the second computer system has crashed.

20. The apparatus of claim 15, wherein the clock values of said first and second processors are stored in a memory-resident table of the first node, and wherein said first clock value of said second processor represents a clock value of said second processor at a time of transmission of said first message and wherein further said second clock value of said second processor represents a clock value of said second processor at a time of transmission of said second message.

21. A method of identifying a second system coupled in communication with a first system, said method comprising:

receiving a first message at a first system and from a second system, said first message comprising a transmission time of said first message as measured by a clock of said second system;

storing said transmission time of said first message in a memory of said first system and storing a reception time of said first message as measured by a clock of said first system;

receiving a second message at said first system and from said second system, said second message comprising a transmission time of said second message as measured by said clock of said second system;

storing said transmission time of said second message in said memory and storing a reception time of said second message as measured by said clock of said first system;

based on said transmission and reception times of said first and second messages, computing a rate relationship between said clocks of said first and second systems;

receiving a third message at said first system and from said second system, said third message comprising a transmission time of said third message as measured by said clock of said second system;

computing an estimated transmission time of said third message based on a reception time of said third message as measured by a clock of said first system and further based on said rate relationship; and identifying said second system by determining that said estimated transmission time of said third message matches said transmission time of said third message as comprised in said third message.

22. A method as described in claim 21 wherein said first message further comprising a start clock value of said clock of said second system and wherein said computing an estimated transmission time of said third message further comprises using said start clock value.

23. A method as described in claim 21 wherein said storing said transmission time of said first message and said storing said transmission time of said second message both comprise storing into a data structure of said memory of said first system.

24. A method as described in claim 21 wherein said third message is transmitted subsequent to said second message and wherein further said second message is transmitted subsequent to said first message.

25. A method as described in claim 21 wherein said determining comprises determining that said estimated transmission time of said third message matches within a predetermined threshold to said transmission time of said third message as comprised in said third message.

* * * * *